Patented Dec. 26, 1933

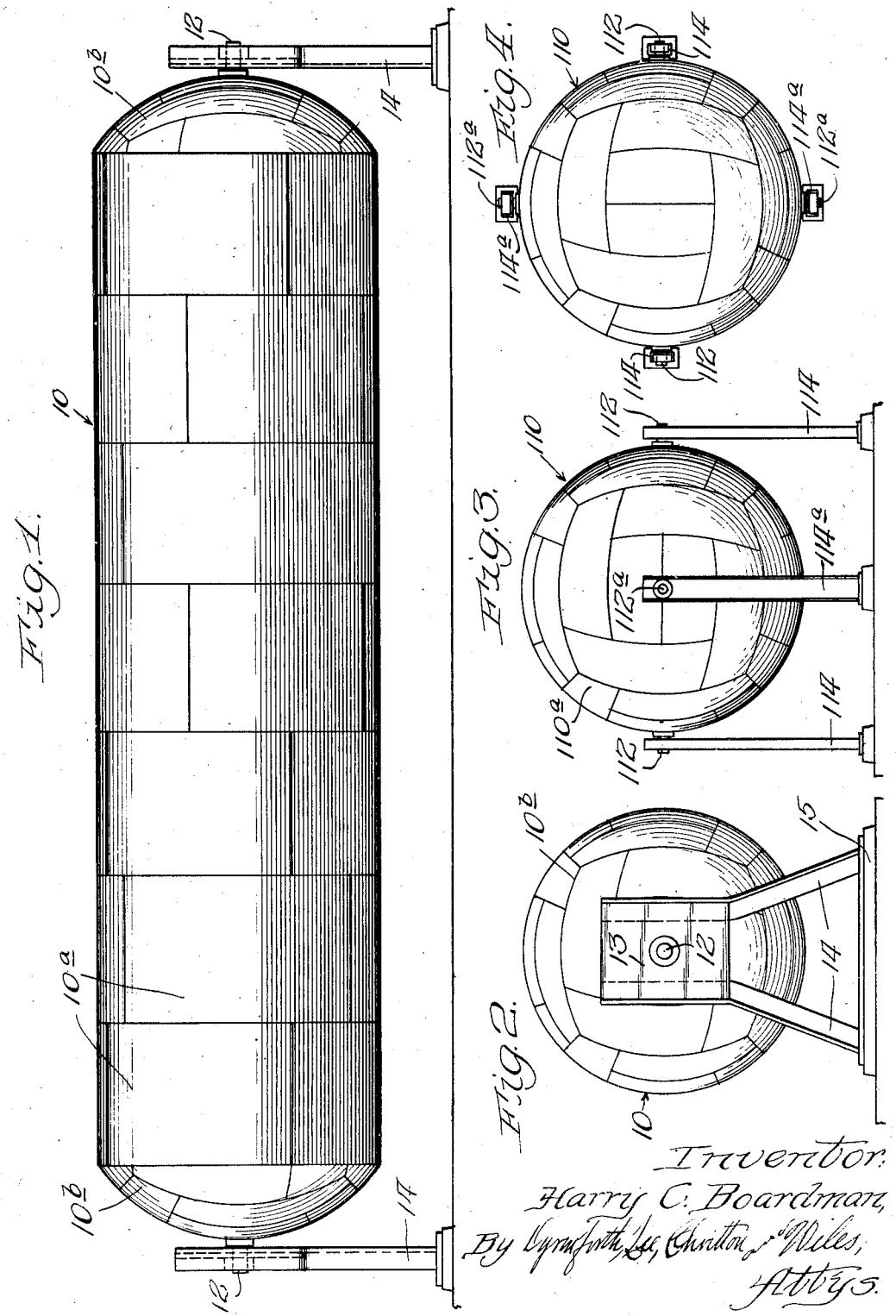

1,940,785

UNITED STATES PATENT OFFICE 1,940,785

METHOD OF WELDING TANKS

Harry C. Boardman, Chicago, Ill., assignor to Chicago Bridge & Iron Company, Chicago, Ill., a corporation of Illinois Application December 21, 1932
Serial No. 648,295

1 Claim. (Cl. 113—112)

This invention relates to improvements in sheet metal containers and method of erecting the same and, more especially, to welded sheet metal containers with a circular cross-section, for example, a substantially cylindrical or substantially spherical container.

Sheet metal containers of the kind referred to are made of sections of sheet metal welded together. In erecting the same, the sections are ordinarily first temporarily fastened with bolts or by tack welding to form the container. After this, the sections must be permanently welded. In welding the seams between sections, it is necessary or desirable to have the plates in substantially horizontal position. In any event, when the plates are substantially horizontal, the welding of the seams is facilitated. It is more or less difficult to weld seams between plates in vertical position, especially when such seams are vertical. With the plates horizontal, the welding metal is more easily retained in the seams.

Among the features of my invention is the provision of a method of erecting containers of the kind referred to, whereby the plates may be always in substantially horizontal position when the seams are permanently welded.

By the use of my invention, there is also provided a permanent support for the container which will permit rotation of the same, thus facilitating painting, repairing, cleaning and inspection of the container.

Other features and advantages of my invention will appear more fully as I proceed with my specification.

In those forms of devices embodying the features of my invention shown in the accompanying drawing—

Figure 1 is a view in side elevation of a cylindrical container; Fig. 2 is an end view of the same; Fig. 3 is a view in side elevation of a spherical container; and Fig. 4 is a top plan view of the same.

As shown in the drawing, 10 may indicate a substantially cylindrical sheet metal container formed of the plates 10ª, 10ª welded together. The heads of the container are formed of the plates 10ᵇ and are somewhat rounded. At the ends of the axis of the container are provided trunnions 12 resting in suitable bearings 13 carried on the posts or legs 14, 14 resting on the foundations 15.

In erecting the container of Fig. 1, the plates and head are first temporarily fastened together to form said container. This temporary fastening may be accomplished in any manner well known in the art, for example, by the use of bolts, tack welding and the like. When thus temporarily assembled, the container is rotatably supported on the trunnions 12, 12. The container is then rotated on the trunnions while the seams between the plates 10ª are permanently welded. This rotation permits the plates to be placed in substantially horizontal position for the welding operation. For example, if the welding is on the outside, all the seams can be welded on top, the tank being rotated to permit such top welding. Likewise, if desired, the seams can be welded on the inside at the bottom with the plates in horizontal position, the tank being rotated to bring the seams to be worked on to the bottom.

In Figs. 3 and 4 I have shown the invention applied to a spherical tank 110 formed of the plates 110ª. Here I have provided a pair of trunnions 112, 112 and a second pair 112ª, 112ª spaced therefrom 90°. These trunnions rest upon supports 114 and 114ª, respectively. By removing the pair of supports 114, 114, the sphere may rotate on the trunnions 112ª, 112ª and by removing the other supports, the sphere may be rotated on the trunnions 112, 112. In this manner, the sphere may be rotated on either pair of trunnions so that any portion of the same may be brought to the top or bottom. Accordingly, the plates of the sphere are first temporarily fastened together and the sphere is then rotated on the trunnions, as stated, in order to bring any seam to be permanently welded to the top or the bottom thereof to permit permanent welding of the same on the outside or inside with the plates in substantially horizontal position.

In each of the forms shown, it is to be understood that the trunnions may remain as the permanent supports for the containers and may be employed to permit rotation of the containers for cleaning, repairing, painting or inspection.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as permissible, in view of the prior art.

What I regard as new, and desire to secure by Letters Patent, is:

The method of erecting a closed sheet metal container with a circular cross-section consisting of first temporarily fastening together sheet metal plates to form said container and rotatably supporting the same at the ends of the axis of said circular cross-section, and then rotating said container on said axis while permanently welding the seams between the sheet metal plates to permit placing of the plates in substantially horizontal position for such permanent welding.

HARRY C. BOARDMAN.